US006956856B2

(12) United States Patent
Sanchez B. et al.

(10) Patent No.: US 6,956,856 B2
(45) Date of Patent: Oct. 18, 2005

(54) SYSTEM AND METHOD FOR MANAGING A PLURALITY OF CALLS

(75) Inventors: Eduardo T. Sanchez B., Saltillo (MX); Oscar Augusto Martinez Coss, Saltillo (MX)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 847 days.

(21) Appl. No.: 09/829,059

(22) Filed: Apr. 9, 2001

(65) Prior Publication Data

US 2002/0146017 A1 Oct. 10, 2002

(51) Int. Cl.[7] .............................................. H04L 12/66
(52) U.S. Cl. .................................... 370/395.2; 370/401
(58) Field of Search ........................ 370/395.2, 395.21, 370/395.3, 395.31, 401, 402, 403, 404, 405, 422, 424, 216, 242

(56) References Cited

U.S. PATENT DOCUMENTS

| | | | |
|---|---|---|---|
| 5,682,325 A | 10/1997 | Lightfoot et al. | 364/514 |
| 6,067,454 A | 5/2000 | Foti | 455/433 |
| 6,226,263 B1 * | 5/2001 | Iwase et al. | 370/231 |
| 6,469,998 B1 * | 10/2002 | Burgaleta Salinas et al. | 370/338 |
| 6,600,735 B1 * | 7/2003 | Iwama et al. | 370/352 |
| 6,680,952 B1 * | 1/2004 | Berg et al. | 370/467 |
| 6,799,210 B1 * | 9/2004 | Gentry et al. | 709/223 |

FOREIGN PATENT DOCUMENTS

| | | |
|---|---|---|
| JP | 10215283 A | 8/1998 |
| WO | WO 01/15487 | 3/2001 |

OTHER PUBLICATIONS

PCT International Search Report dated Oct. 16, 2002 from the European Patent Office.

* cited by examiner

*Primary Examiner*—Kwang Bin Yao

(57) ABSTRACT

A system and method to manage a plurality of calls, comprises a first node including a memory for receiving a message announcing a through-connection for a first call and recording a record of the first call (including an indication of the through-connection) in the memory. A second node is in electronic communication with the first node for making the through-connection for the first selected call. The method includes connecting a first call selected from the plurality of calls to provide a first call through-connection at the second node, receiving a message at the first node announcing the first call through-connection, and making a record of the first call in the memory of the first node. Restart operations may be announced and calls will be released by the second node if records made of the calls in the first node include an indication of a corresponding through-connection.

21 Claims, 3 Drawing Sheets

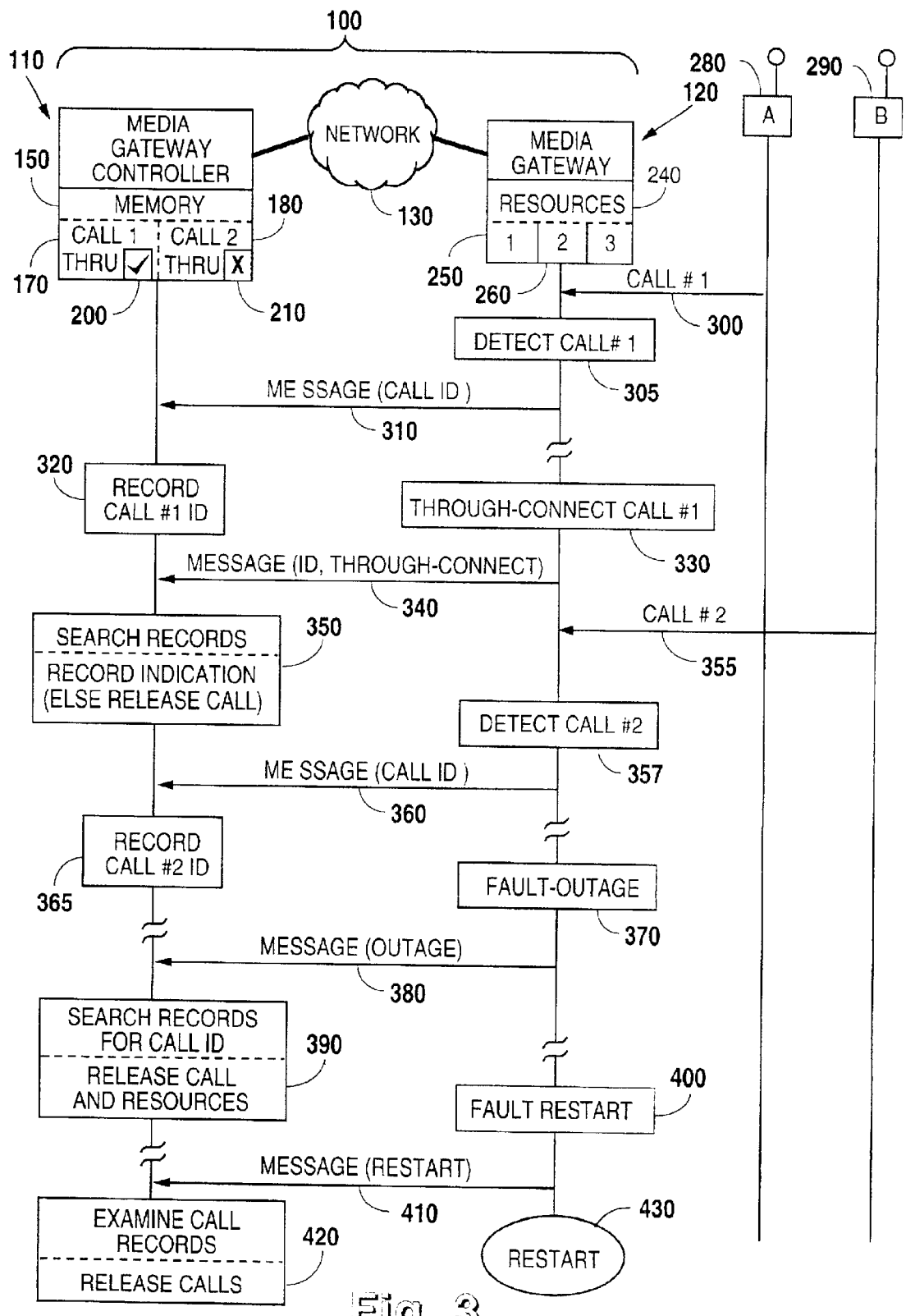

SYSTEM AND METHOD FOR MANAGING A PLURALITY OF CALLS

BACKGROUND OF THE INVENTION

1. Technical Field

This invention relates generally to systems and methods for managing telephone calls within a network. More particularly, the invention relates to a system and method for managing a plurality of calls between two nodes, typically a media gateway and a media gateway controller.

2. History of Related Art

Current telecommunication network architectures include a single node, such as a Mobile Switching Center (MSC), which acts as a combination call gateway and gateway controller. In this single node system, information about the state of telephone calls managed by the node is shared within the node among various components, which include hardware devices, hardware control modules, and call control modules. FIG. 1 illustrates a schematic block diagram for this type of prior art gateway/gateway controller combination node 10.

The prior art combination node 10 includes a call control module 60 in electronic communication with a hardware control module 50. Several hardware devices 20, 30, and 40, such as voice trunks, announcement machines, switching modules, etc. are directly controlled by the hardware control module 50. In this prior art configuration, wherein the combination node 10 is typically embodied by a MSC, all of the information related to calls and their status is shared between the call control module 60 and the hardware control module 50 using internal software communication methods well known in the art.

Communications standards change rapidly. Newer standards may require separation of the control functions module 70 within a telecommunications node from the hardware functions module 80 within the node. Typical of such standards is the International Telecommunications Union Telecom Standards Sector (ITU-T) recommendation H.248 (incorporated herein by reference in its entirety), which defines the communications protocol used between elements of such a physically decomposed multimedia gateway. While simple communications between the control functions 70 and hardware functions 80 have been generally defined, methods and systems to handle specific events which occur during operation of the functional elements 70, 80 have not been addressed.

For example, assuming that the control functions module 70 is represented by a media gateway controller and the hardware functions module 80 is represented by a media gateway, as described in the ITU-T recommendation H.248, several operating scenarios arise which are not addressed by the protocol recommendation. These include circumstances surrounding a single call outage, a small restart operation, and a large restart operation.

The single call outage situation occurs when the hardware functions module 80 experiences a fault due to a particular call. The hardware functions module 80 typically acts to release the call, but fails to inform the control functions module 70 with regard to the call release activity.

Another event, often caused by software faults detected within the hardware functions module 80, is a small restart operation. This occurs when the hardware functions module 80 experiences a fault during the setup phase of a single call. The module 80 experiences the fault, but is unable to determine precisely which call (out of a plurality of calls handled by the module 80) is responsible for the fault. Therefore, all of the calls handled by the hardware functions module 80 (which are still in the setup phase) are released by the module 80.

Finally, another operation which may arise within the hardware functions module 80 is a large restart. This can occur when the hardware functions module 80 detects a fault related to one of a plurality of calls it is handling. However, the hardware functions module 80 is unable to determine precisely which call is responsible for the fault, and is also unable to determine which phase is operative (i.e., the setup phase or the through-connected phase) for the faulty call. While the control functions module 70 is informed of the fault, all of the calls must be released by the hardware functions module 80.

Thus, while a prior art combination node 10 is able to share information between the call control module 60 and the hardware control module 50, separating the node 10 into functional elements 70, 80, as required by various standards, leads to diminished ability to distinguish and efficiently handle various operational scenarios. More specifically, while there may be several levels of faulty behavior within the hardware functions module 80, only the most egregious (i.e., a large restart operation) is communicated from the hardware functions module 80 to the control functions module 70.

Therefore, what is needed is a system and method for managing a plurality of calls between separated functional elements, such as a first node (e.g., a control functions module, or a media gateway controller) and a second node (e.g., a hardware functions module, or a media gateway). Such a system and method should operate to record the existence of calls handled within the second node, and especially, to record an indication of whether each call has entered the through-connected phase. Further, call outage fault detection and small restart operations should be fully communicated to the first node by the second node as they arise. Such a system and method would allow the first and second nodes to operate with increased effectiveness.

SUMMARY OF THE INVENTION

The invention includes a system adapted to manage a plurality of calls including a first node, such as a media gateway controller, in electronic communication with a second node, such as media gateway. The first node includes a memory for receiving messages from the second node regarding through-connections and restart operations. The memory is used to make a record of calls made to the second node, along with indications of through-connections which occur for each of the calls.

The second node typically includes a plurality of resources, of which at least one is dedicated to one or more calls selected from the plurality of managed calls. Announcements of call outage faults, or restart operations, are sent from the second node to the first node as they occur, and dedicated resources are released as needed.

The invention also includes a method of using a first node to manage a plurality of calls maintained by a second node. The method comprises the steps of connecting a call selected from a plurality of calls to provide a through-connection at the second node, receiving a message at the first node announcing the through-connection, and making a record of the call, including an indication of the through-connection at the second node in the memory of in the first node. As noted above, the first node may be a media gateway controller, and the second node may be a media gateway.

The method may further include the steps of receiving a message announcing a single call outage for a call maintained by the second node, and releasing resources dedicated to the call. Typically, these resources are software program module resources, and at least one resource is dedicated to the call to be released. Typically, the method also includes the steps of detecting the call during its setup phase and making a record of the call in the memory of the first node without any indication that a through-connection has been made for the call (within the second node).

The method may be further augmented by detecting other calls during their setup phases, making records of the calls in the memory, receiving a message announcing a restart operation within the second node, and examining the call records to determine which of the other calls does not include an indication that a through-connection has been made for the call. Those calls without recorded indications of through-connections are then released.

Finally, the messages used to announce through-connections and call outage faults may be NOTIFY messages, such as those described in the ITU-T recommendation H.248. The message announcing a restart operation may be a SERVICE CHANGE message, also described in the H.248 recommendation.

BRIEF DESCRIPTION OF THE DRAWINGS

A more complete understanding of the structure and operation of the present invention may be had by reference to the following detailed description when taken in conjunction with the accompanying drawings, wherein:

FIG. 3 is a network signal flow diagram illustrating the method of the present invention.

DETAILED DESCRIPTION OF PRESENTLY PREFERRED EXEMPLARY EMBODIMENTS

Figure 1:
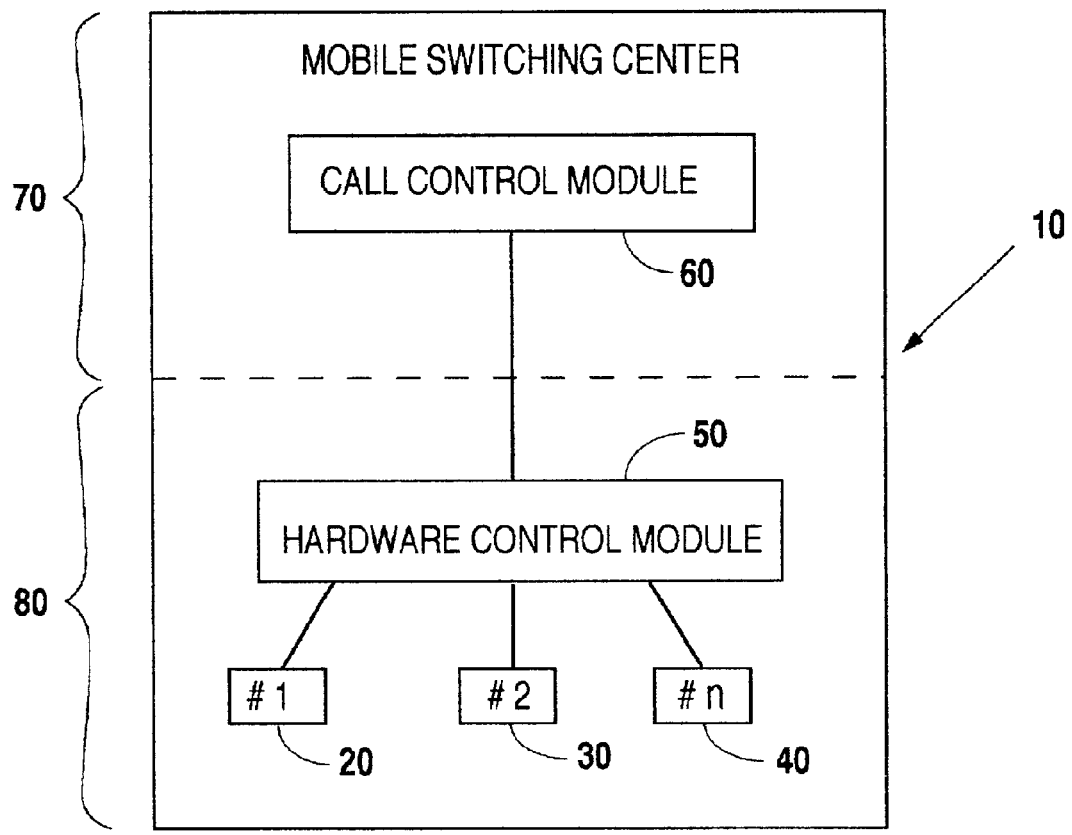
FIG. 1, previously described, is a prior art schematic block diagram of a combination node.
Figure 2:
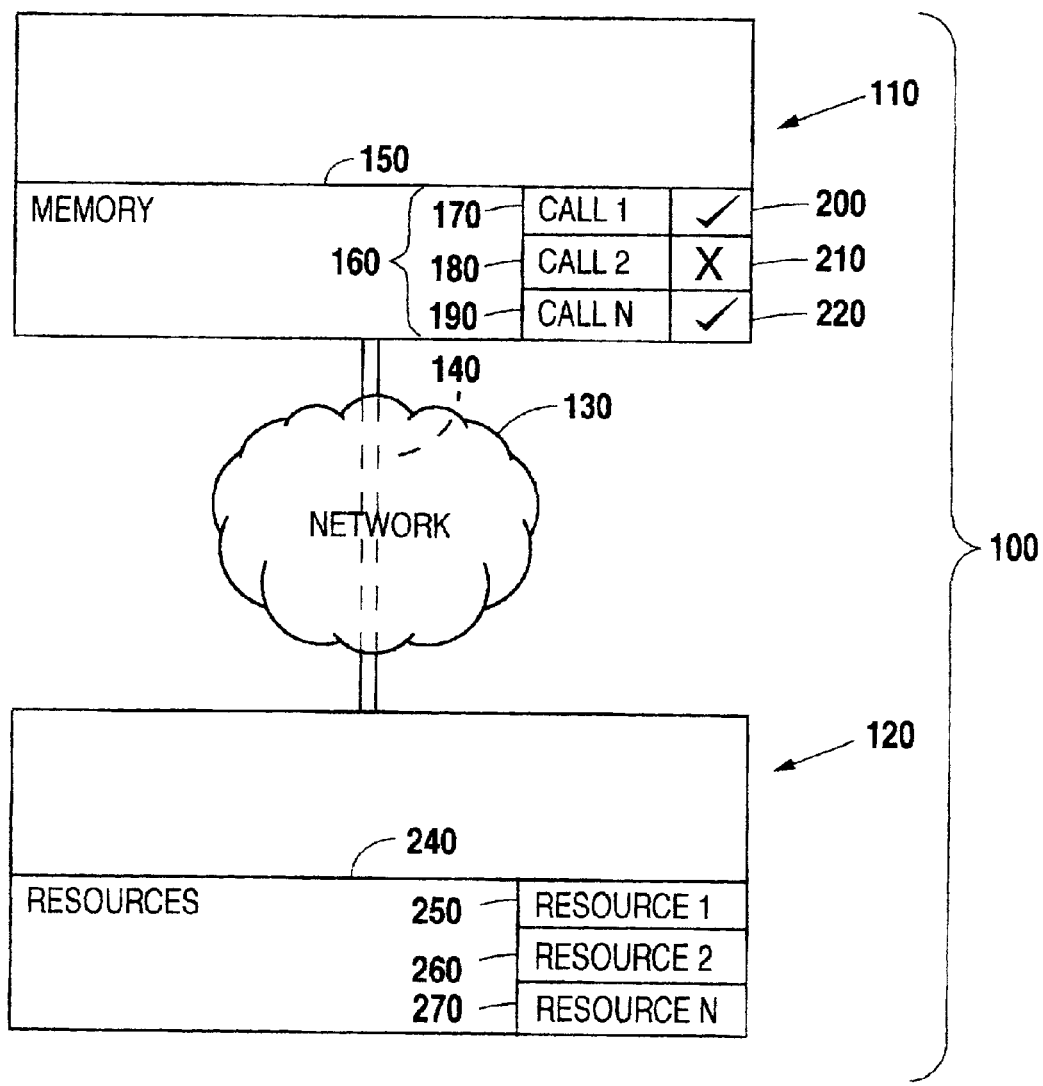
FIG. 2 is a schematic block diagram of the system of the present invention.

FIG. 2 is a schematic block diagram of the system 100 of the present invention. The system 100, adapted to manage a plurality of calls, includes a first node 110, such as a media gateway controller, and a second node 120, such as a media gateway. The first node 110 includes a memory 150 in which records 160 of calls are recorded. For example, the memory 150 may include a first call record 170, a second call record 180, and an $N^{th}$ call record 190. Records 160 of the calls, which may or may not be through-connected, are recorded in the memory 150, along with an indication of whether the call is through-connected. For example, in FIG. 2, the first call record 170 includes an indication 200 of a through-connection for a call. The second call record 180 has been recorded without an indication 210 of a through-connection for a second call. Finally, the $N^{th}$ call record 190 has been recorded along with an indication 220 of a through-connection for the $N^{th}$ call. Thus, the indications 200, 220 of call through-connections in the records 160 of the calls may be software flags which are "set" to indicate that a through connection has been made for the first and $N^{th}$ calls. Of course, if no through-connection has been made for a particular call, then the record 160 may be recorded in the memory 150 without any indication of the through connection for that particular call (e.g., the call record 180 has been recorded without any indication 210 of a through-connection for the second call).

The first node 110 is in electronic communication with the second node using a network 130, such as a global telecommunications network, e.g., the Internet. The first node 110 may also be connected to the second node 120 in a more direct fashion, using a wire line 140, which is equivalent to, or identical to, a wired connection, a fiber-optic connection, or a wireless connection.

The second node 120 is responsible for receiving a plurality of calls as they are set up (i.e., during the setup phase) and making through-connections for the calls as needed. The second node 120 also sends messages to the first node 110 regarding calls received, through-connections which have been made, call outage faults, and restart operations. Such messages may take the form of NOTIFY messages, or SERVICE CHANGE messages, as described in the ITU-T recommendation H.248 (described below). The second node includes a plurality of resources 240, including resources which may be dedicated to one or more of the calls. For example, the second node 120 may include a first resource 250, a second resource 260, and an $N^{th}$ resource 270, dedicated to a first call, a second call, and an $N^{th}$ call, respectively.

FIG. 3 is a network signal flow diagram illustrating the method of the present invention. The various components shown are identical to, or similar to, the system 100 (having a media gateway controller 110 and a media gateway 120) shown in FIG. 2, whose elements are connected by a network 130. In the exemplary scenario illustrated in FIG. 3, a first calling party 280 makes a first call 300 to the second node 120 at step 300. The first call is detected within the second node 120 at step 305. A message containing the identity of the first call is then sent from the second node 120 to the first node 110 in step 310, after the first call has been detected during its setup phase within the second node 120. Between steps 310 and 330 there are several other actions which may be taken to establish the call, well known to those skilled in the art, but they are not relevant to the method, and are therefore not discussed herein. After receiving the message in step 310, the first node 110 records a record 170 of the first call in its memory 150 at step 320, including an identification number for the first call. This record will be made without any indication of a through-connection for the first call in the second node 120. However, after the first call is through-connected within the second node 120 at step 330, a message will be received by the first node 110 announcing the first call through-connection at the second node 120 in step 340. After receiving the through-connect message, the first node 110 will search the records in the memory 150 to determine whether the first call record exists in step 350. Since a record 170 was indeed recorded in step 320, then the indication 200 of a through-connection for the first call can be made in the first call record 170. The indication is typically realized as a flag that is "set". In the event that no record is found to correspond with a through-connected call identification number, then that call corresponding to the through-connection message of step 340 will be released. The through-connection message of step 340 may take the form of a NOTIFY message, as described in the ITU-T recommendation H.248. Finally, the record 170 of the first call, including an indication 200 of the first call through-connection at the second node 120 will be recorded in the memory 150 of the first node 110 at step 350.

Subsequent calls, such as a second call from a second calling party 290, may be made at step 355 and detected during its setup phase within the second node 120, as is shown at step 357. After detection at step 357, a message is received at the first node 110, containing the identity of the second call in step 360. After step 360, there are several other actions which may be taken to establish the call, well known to those skilled in the art, but these are not relevant to the method described herein. Then, in step 365, the method continues by recording a record 180 in the memory 150 of the second call (without any indication of a second call through connection), using the identification number of the second call.

At this point, several different types of events may occur, such as a single call outage (wherein the fault can be traced to a particular call during the setup phase), or faults which are detected by the second node 120 which in turn is unable to determine that a particular call caused the fault, and/or is unable to determine the phase of the faulty call (i.e., setup phase or through-connection phase).

In a first scenario, a fault may be detected wherein the second node 120 is able to determine the particular call which is faulty, as well as the fact that the faulty call is in its setup phase. This occurs in step 370. Given these conditions, the first node 110 may receive a message announcing a single call outage for the second call. For example, after detecting the fault in step 370, the second node 120 can send such a message indicating the nature of the fault in step 380 to the first node 110. This message may be in the form of a NOTIFY message, as described in the ITU-T recommendation H.248. After the message indicating a call outage event is received by the first node 110 in step 380, the resources dedicated to the second call may be released by the second node 120 in step 390. Thus, out of the plurality of resources 240 (such as software program module resources) included in the second node 120, a second resource 260 dedicated to the second call made in step 357 can be released in step 390.

Another possible fault condition is one leading up to a restart operation within the second node 120. For example, in a second scenario, the second node 120 may experience a fault during the setup phase of one or more calls. However, the precise call which is faulty cannot be determined. This may occur at step 400, wherein a fault within the second node 120 requiring some type of restart operation is detected. In this case, a message will be received by the first node 110 announcing a restart operation within the second node 120 in step 410. This message may take the form of a SERVICE CHANGE message (described in the ITU-T recommendation H.248) wherein the designated "method" is a "small restart". At this point, the first node 110 will examine the call records to determine which calls have been recorded with no indication of being in a through-connected phase. For example, in FIG. 3, the indication 200 of a through-connection for the first call exists in the record 170 in the memory 150 of the first node 110. However, there is no indication 210 of the second call through-connection in the record 180 of the second call in the memory 150 of the first node 110. After the call records 170, 180 are examined in step 420, the second call will be released. Thus, all calls that do not have an indication of a through-connection will be released during the restart operation 430 of the second node 120.

Although the invention has been described with reference to specific embodiments, this description is not meant to be construed in a limited sense. The various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention, or their equivalents.

What is claimed is:

1. A method of using a first node to manage a plurality of calls maintained by a second node, comprising the steps of:
   connecting a first call selected from the plurality of calls to provide a first call through-connection at the second node;
   receiving a message at the first node announcing the first call through-connection at the second node; and
   recording a record associated with the first call the record associated with the first call including an indication of the first call through-connection at the second node in a memory of the first node;
   detecting a second call selected from the plurality of calls during a second setup phase;
   recording a record associated with the second call in the memory without an indication of a second call through-connection;
   receiving a message at the first node announcing a restart operation within the second node;
   examining the record associated with the first call and the record associated with the second call;
   determining that the record associated with the second call does not include the indication of the second call through-connection; and
   releasing the second call.

2. The method of claim 1, further including the step of: searching the memory for the record associated with the first call.

3. The me claim 1, wherein the second node includes a plurality of resources, and wherein at least one resource selected from the plurality of resources is dedicated to the first call, further including the steps of:
   receiving a message at the first node announcing a single call outage for the first call; and
   releasing the at least one resource.

4. The method of claim 3, wherein the at least one resource is a software program module resource.

5. The method of claim 4, wherein the message announcing the restart operation is a SERVICE CHANGE message.

6. The method of claim 4, wherein the restart operation is initiated due to detecting a fault within the second node during a setup phase of an undetermined at least one of the plurality of calls.

7. The method of claim 3, wherein the message announcing the single call outage is a NOTIFY message.

8. The method of claim 1, wherein the first node is a media gateway controller and the second node is a media gateway.

9. The method of claim 1, wherein the message announcing the first call through-connection is a NOTIFY message.

10. The method of claim 1, wherein the indication of the first call through-connection in the record associated with the first call is a set flag.

11. A first node in a network adapted for managing a plurality of calls comprising:
   a memory for storing a call record associated with a first call wherein the call record associated with a first call includes an indication of a through-connection of the first call at a second node;
   detection means for detecting a second call selected from the plurality of calls during a second setup phase;
   the memory having means for storing a call record associated with the second call without an indication of a second call through-connection;
   means for receiving a message at the first node announcing a restart operation within the second node;

means for examining the record associated with the first call and the record associated with the second call;

means for determining that the record associated with the second call does not include the indication of the second call through-connection; and means for releasing the second call.

12. The first node of claim 11, wherein the second node comprises means for making the through-connection for the first call in electronic communication with the first node.

13. The first node of claim 11, further including means for searching the memory for the record associated with the first call.

14. The first node of claim 13, wherein the restart operation is initiated due to detecting a fault within the second node during a setup phase of at least one of the plurality of calls.

15. The first node of claim 11, wherein the second node includes a plurality of resources and at least one resource selected from the plurality of resources is dedicated to the first call, and the first node further comprises:

means for receiving a message announcing a single call outage for the first call; and means for releasing the at least one resource.

16. The first node of claim 15, wherein the at least one resource is a software program module resource.

17. The first node of claim 15, wherein the message announcing the single call outage is a NOTIFY message.

18. The first node of claim 15, wherein the message announcing the restart operation is SERVICE CHANGE message.

19. The first node of claim 11, wherein the first node is a media gateway controller and the second node is a media gateway.

20. The first node claim 11, wherein the message announcing the first call through-connection is a NOTIFY message.

21. The first node claim 11, wherein the indication of the first call through-connection in the record associated with the first call is a set flag.

* * * * *